US012585967B1

(12) United States Patent
Zhao et al.

(10) Patent No.: US 12,585,967 B1
(45) Date of Patent: Mar. 24, 2026

(54) KNOWLEDGE BASE GENERATION

(71) Applicant: Intuit Inc., Mountain View, CA (US)

(72) Inventors: Chenyun Zhao, Mountain View, CA (US); Dusan Bosnjakovic, Los Angeles, CA (US); Victor Francisco Calderon Arrivillaga, Santa Clara, CA (US); Clifford Green, San Diego, CA (US); Brian Smith, Austin, TX (US); Tomer Tal, Sudbury, MA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/284,001

(22) Filed: Jul. 29, 2025

(51) Int. Cl.
*G06N 5/022* (2023.01)
(52) U.S. Cl.
CPC .................................... *G06N 5/022* (2013.01)
(58) Field of Classification Search
None
See application file for complete search history.

(56) References Cited

U.S. PATENT DOCUMENTS

| | | | |
|---|---|---|---|
| 5,704,029 | A | 12/1997 | Wright, Jr. |
| 8,660,849 | B2 | 2/2014 | Gruber et al. |
| 9,043,386 | B2 | 5/2015 | Halevi et al. |
| 9,436,670 | B2 | 9/2016 | Anderson et al. |
| 9,460,058 | B2 | 10/2016 | Maertens et al. |
| 9,766,694 | B2 | 9/2017 | Jung et al. |
| 10,354,014 | B2 | 7/2019 | Sharma et al. |
| 10,354,132 | B2 | 7/2019 | Kavikkal et al. |
| 10,445,419 | B2 | 10/2019 | Gaither et al. |
| 10,460,024 | B2 | 10/2019 | Gaither et al. |
| 10,606,618 | B2 | 3/2020 | Lubow et al. |
| 10,657,200 | B2 | 5/2020 | Gaither et al. |
| 11,113,358 | B2 | 9/2021 | Kieffaber |
| 11,308,265 | B1 | 4/2022 | Cohen et al. |
| 11,308,266 | B1 | 4/2022 | Estrada Diaz |
| 11,316,865 | B2 | 4/2022 | Gallopyn et al. |
| 11,606,463 | B1 | 3/2023 | Yeracaris et al. |
| 11,714,601 | B1 | 8/2023 | Knigh et al. |

(Continued)

OTHER PUBLICATIONS

Chen, Zichen, et al. "Xplainllm: A qa explanation dataset for understanding llm decision-making." (2023). (Year: 2023).*

*Primary Examiner* — Eric Nilsson
(74) *Attorney, Agent, or Firm* — Paradice & Li LLP

(57) ABSTRACT

Systems and methods for generating a knowledge base for facilitating interactions between users and an automated assistant. An example method is performed by one or more processors of a computing system. The example method may include receiving a transmission over a communications network from a computing device, the transmission including a plurality of transcripts of user interactions with the automated assistant or agents associated with the computing system, transforming ones of the transcripts into one or more question-and-answer (Q & A) pairs associated with a subject of the corresponding user interaction, and embedding ones of the Q & A pairs as vectors in a vector space for retrieval by the automated assistant during subsequent user interactions. Another example method may include identifying a point in vector space corresponding to a determined subject of a received user query and generating an answer based on Q & A pairs reconstructed from relevant vector embeddings in the knowledge base.

20 Claims, 7 Drawing Sheets

(56)  References Cited

U.S. PATENT DOCUMENTS

| | | | |
|---|---|---|---|
| 11,765,104 B2 | 9/2023 | Taslimi et al. | |
| 11,875,130 B1 * | 1/2024 | Bosnjakovic | G06N 5/022 |
| 11,875,240 B1 * | 1/2024 | Bosnjakovic | G06N 3/08 |
| 12,003,668 B1 | 6/2024 | Yeracaris et al. | |
| 12,210,839 B1 * | 1/2025 | Burton | G06T 11/206 |
| 12,307,065 B1 | 5/2025 | Browder | |
| 12,393,433 B2 | 8/2025 | Agarwal et al. | |
| 2002/0062342 A1 | 5/2002 | Sidles | |
| 2004/0036722 A1 | 2/2004 | Warren | |
| 2004/0068527 A1 | 4/2004 | Smith, III | |
| 2008/0276194 A1 | 11/2008 | Dykstra-Erickson et al. | |
| 2012/0016678 A1 | 1/2012 | Gruber et al. | |
| 2012/0089659 A1 | 4/2012 | Halevi et al. | |
| 2015/0363376 A1 | 12/2015 | Anderson et al. | |
| 2016/0062955 A1 | 3/2016 | Maertens et al. | |
| 2016/0342431 A1 | 11/2016 | Huang | |
| 2017/0192948 A1 | 7/2017 | Gaither et al. | |
| 2017/0192949 A1 | 7/2017 | Gaither et al. | |
| 2017/0192950 A1 | 7/2017 | Gaither et al. | |
| 2017/0206096 A1 | 7/2017 | Lubow et al. | |
| 2017/0336933 A1 | 11/2017 | Hassel | |
| 2018/0069766 A1 | 3/2018 | Falkenberg | |
| 2018/0307682 A1 | 10/2018 | Sharma et al. | |
| 2019/0065839 A1 | 2/2019 | Kavikkal et al. | |
| 2019/0147029 A1 | 5/2019 | Chiu et al. | |
| 2020/0004878 A1 | 1/2020 | Beaumont et al. | |
| 2021/0044546 A1 | 2/2021 | Taslimi et al. | |
| 2021/0051152 A1 | 2/2021 | Gallopyn et al. | |
| 2021/0073301 A1 | 3/2021 | Kieffaber | |
| 2021/0157978 A1 | 5/2021 | Haramati et al. | |
| 2021/0166339 A1 | 6/2021 | Mann | |
| 2021/0201240 A1 | 7/2021 | Yanamala | |
| 2022/0067270 A1 | 3/2022 | Tan | |
| 2022/0121808 A1 | 4/2022 | Estrada Diaz | |
| 2022/0269859 A1 | 8/2022 | Topol | |
| 2022/0358448 A1 | 11/2022 | Beringer et al. | |
| 2022/0400092 A1 | 12/2022 | Orkin et al. | |
| 2023/0298568 A1 | 9/2023 | Moya | |
| 2023/0333867 A1 | 10/2023 | Agarwal et al. | |
| 2023/0359812 A1 | 11/2023 | Cohen et al. | |
| 2024/0144916 A1 | 5/2024 | Britt et al. | |
| 2024/0179218 A1 | 5/2024 | Jung | |
| 2024/0220292 A1 | 7/2024 | Ellis | |
| 2025/0068833 A1 | 2/2025 | Wong et al. | |
| 2025/0103746 A1 * | 3/2025 | Gharibi | G06F 21/6227 |
| 2025/0245423 A1 | 7/2025 | Agarwal et al. | |
| 2025/0252252 A1 | 8/2025 | Shetty et al. | |
| 2025/0315142 A1 | 10/2025 | Gilabert Llop et al. | |
| 2025/0315598 A1 | 10/2025 | Burgess et al. | |
| 2025/0355697 A1 | 11/2025 | Stach et al. | |

* cited by examiner

600

Receive a transmission over a communications network from a computing device, the transmission including a plurality of transcripts of user interactions with the automated assistant or agents associated with the computing system. (610)

Transform ones of the transcripts into one or more question-and-answer (Q&A) pairs associated with a subject of the corresponding user interaction. (620)

Embed ones of the Q&A pairs as vectors in a vector space for retrieval by the automated assistant during subsequent user interactions associated with similar subjects. (630)

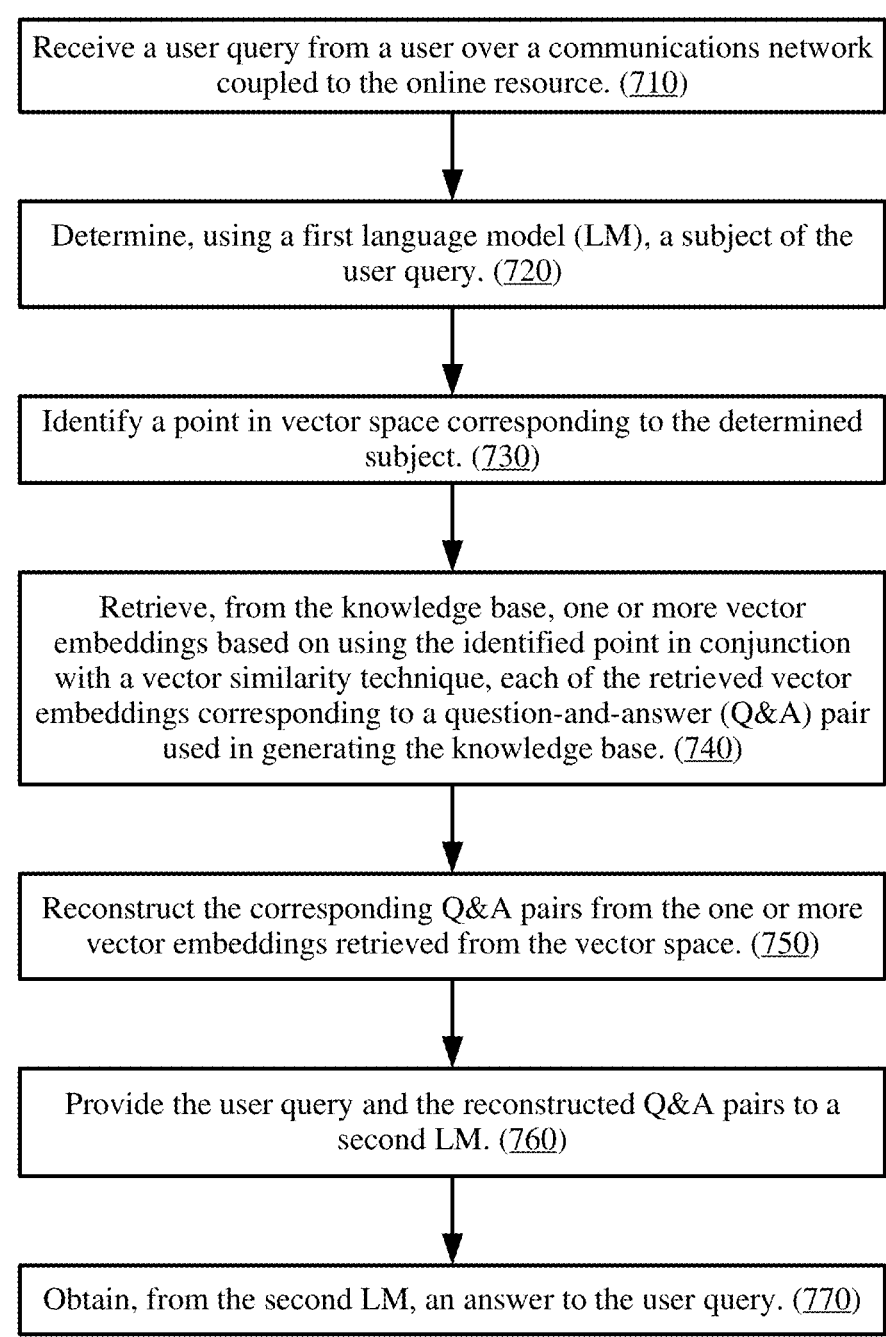

Receive a user query from a user over a communications network coupled to the online resource. (710)

Determine, using a first language model (LM), a subject of the user query. (720)

Identify a point in vector space corresponding to the determined subject. (730)

Retrieve, from the knowledge base, one or more vector embeddings based on using the identified point in conjunction with a vector similarity technique, each of the retrieved vector embeddings corresponding to a question-and-answer (Q&A) pair used in generating the knowledge base. (740)

Reconstruct the corresponding Q&A pairs from the one or more vector embeddings retrieved from the vector space. (750)

Provide the user query and the reconstructed Q&A pairs to a second LM. (760)

Obtain, from the second LM, an answer to the user query. (770)

*Figure 7*

KNOWLEDGE BASE GENERATION

TECHNICAL FIELD

This disclosure relates generally to knowledge base generation, and specifically to generating a knowledge base for facilitating interactions between users and an automated assistant and/or using a knowledge base to generate an answer to a user's query.

DESCRIPTION OF RELATED ART

While traditional software products were typically installed on and executed by users' personal computers, many of today's software products and services reside partially or entirely online and can be remotely accessed by its users via one or more communications networks (such as the Internet). Although the increasing sophistication of these software products and services allow them to handle increasingly complicated tasks, the resulting complication of their user interfaces can overwhelm and frustrate users, which in turn leads to greater numbers of user requests for assistance associated with these software products and services.

To address this issue, many online resources employ automated assistants, such as chatbots and virtual assistants, that utilize artificial intelligence (AI) models to provide users with 24/7 product and/or service assistance in a cost-effective manner. Many automated assistants employ multiple large language models (LLMs) that can be trained to generate responses to different user questions or queries. These assistants typically engage in user interactions through various channels, such as text-based conversations and voice-based dialogues.

However, the effectiveness of these assistants can be limited by the availability of relevant information, as they often rely on manually created agent articles or knowledge bases that may not keep pace with evolving user needs. Therefore, AI assistants often suffer from gaps in knowledge that result in users' questions or issues not being adequately addressed. In such cases, users may still need to escalate their issues to human support, which can undermine the efficiency and cost-effectiveness that these automated assistants are intended to provide.

Accordingly, there remains a significant need for more advanced solutions that can effectively address a wider range of user inquiries without relying on manual intervention or escalating issues to human support.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method for generating a knowledge base for facilitating interactions between users and an automated assistant. An example method is performed by one or more processors of a computing system. The example method can include receiving a transmission over a communications network from a computing device, the transmission including a plurality of transcripts of user interactions with the automated assistant or agents associated with the computing system. The example method can include transforming ones of the transcripts into one or more question-and-answer (Q & A) pairs associated with a subject of the corresponding user interaction. The example method can include embedding ones of the Q & A pairs as vectors in a vector space for retrieval by the automated assistant during subsequent user interactions associated with similar subjects.

Another innovative aspect of the subject matter described in this disclosure can be implemented in a computing system for generating a knowledge base for facilitating interactions between users and an automated assistant. An example system includes one or more processors and at least one memory coupled to the one or more processors and storing instructions that, when executed by the one or more processors, cause the system to perform operations. The operations can include receiving a transmission over a communications network from a computing device, the transmission including a plurality of transcripts of user interactions. The operations can include transforming ones of the transcripts into one or more Q & A pairs associated with a subject of the corresponding user interaction. The operations can include embedding ones of the Q & A pairs as vectors in a vector space for retrieval by the automated assistant during subsequent user interactions associated with similar subjects.

Another innovative aspect of the subject matter described in this disclosure can be implemented as a non-transitory computer-readable medium storing instructions that, when executed by one or more processors of a system for generating a knowledge base for facilitating interactions between users and an automated assistant, cause the system to perform operations. The operations can include receiving a transmission over a communications network from a computing device, the transmission including a plurality of transcripts of user interactions with the automated assistant or agents associated with the computing system. The operations can include transforming ones of the transcripts into one or more Q & A pairs associated with a subject of the corresponding user interaction. The operations can include embedding ones of the Q & A pairs as vectors in a vector space for retrieval by the automated assistant during subsequent user interactions associated with similar subjects.

Another innovative aspect of the subject matter described in this disclosure can be implemented as a method for using a knowledge base to generate an answer to a user's query. An example method is performed by one or more processors of a computing system. The example method can include receiving a user query. The example method can include determining, using a first language model (LM), a subject of the user query. The example method can include identifying a point in vector space corresponding to the determined subject. The example method can include retrieving, from the knowledge base, one or more vector embeddings based on using the identified point in conjunction with a vector similarity technique, each of the retrieved vector embeddings corresponding to a Q & A pair used in generating the knowledge base. The example method can include reconstructing the corresponding Q & A pairs from the one or more vector embeddings retrieved from the vector space. The example method can include providing the user query and the reconstructed Q & A pairs to a second LM. The example method can include obtaining, from the second LM, an answer to the user query.

Another innovative aspect of the subject matter described in this disclosure can be implemented in a computing system for using a knowledge base to generate an answer to a user's query. An example system includes one or more processors and at least one memory coupled to the one or more processors and storing instructions that, when executed by the one or more processors, cause the system to perform operations. The operations can include determining, using a first language model (LM), a subject of the user query. The operations can include identifying a point in vector space corresponding to the determined subject. The operations can include retrieving, from the knowledge base, one or more vector embeddings based on using the identified point in conjunction with a vector similarity technique, each of the retrieved vector embeddings corresponding to a Q & A pair used in generating the knowledge base. The operations can include reconstructing the corresponding Q & A pairs from the one or more vector embeddings retrieved from the vector space. The operations can include providing the user query and the reconstructed Q & A pairs to a second LM. The operations can include obtaining, from the second LM, an answer to the user query.

Another innovative aspect of the subject matter described in this disclosure can be implemented as a non-transitory computer-readable medium storing instructions that, when executed by one or more processors of a system for using a knowledge base to generate an answer to a user's query, cause the system to perform operations. The operations can include determining, using a first language model (LM), a subject of the user query. The operations can include identifying a point in vector space corresponding to the determined subject. The operations can include retrieving, from the knowledge base, one or more vector embeddings based on using the identified point in conjunction with a vector similarity technique, each of the retrieved vector embeddings corresponding to a Q & A pair used in generating the knowledge base. The operations can include reconstructing the corresponding Q & A pairs from the one or more vector embeddings retrieved from the vector space. The operations can include providing the user query and the reconstructed Q & A pairs to a second LM. The operations can include obtaining, from the second LM, an answer to the user query.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows an illustrative flowchart depicting an example operation for generating a knowledge base for facilitating interactions between users and an automated assistant, according to some implementations.

FIG. 7 shows an illustrative flowchart depicting an example operation for using a knowledge base to generate an answer to a user's query, according to some implementations.

Like numbers reference like elements throughout the drawings and specification.

DETAILED DESCRIPTION

Figure 1:
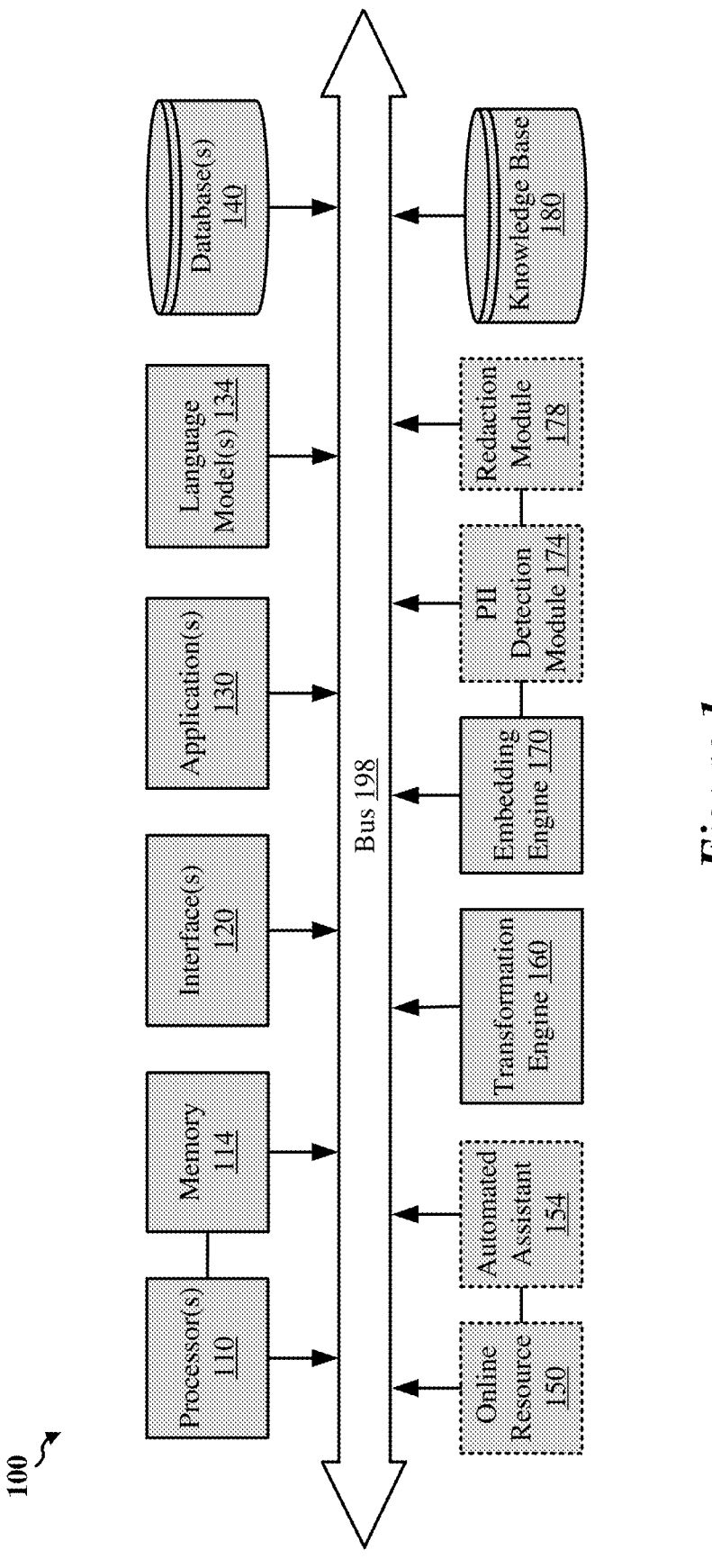
FIG. 1 shows an example computing system, according to some implementations.

Conventional techniques for generating reference material for user interaction artificial intelligence (AI) models have relied heavily on manual creation of articles or databases. However, these manually created resources are often out-of-date and lacking in volume and variety, and thus result in gaps in knowledge that lead to an inadequate response or a complete failure in addressing user inquiries.

To address these challenges, aspects of the present disclosure provide specific, systematic steps for generating a comprehensive and accurate knowledge base by leveraging transcript data from user interactions (e.g., with agents, text-or-audio chatbots, and/or virtual assistants). By transforming transcripts into question-and-answer (Q & A) pairs and selectively embedding them as vectors in a vector space, aspects of the present disclosure enable automated assistants to efficiently retrieve relevant information during subsequent user interactions even when a topic of the user's query has not previously been seen. Furthermore, the techniques described herein can be used to generate a knowledge base that is not limited to a specific format (e.g., frequently asked questions (FAQs)) but that can accommodate various other formats (e.g., step-by-step guidance, instructionals, troubleshooting guides, forums) to assist users with similar issues. In these and other manners, aspects of the present disclosure may be implemented to improve the efficiency and effectiveness of automated assistants deployed during user interactions.

Specifically, the method steps and system operations disclosed herein include receiving transcripts of user interactions, selectively transforming the transcripts into Q & A pairs associated with specific subjects, and selectively embedding the Q & A pairs as vectors in a vector space for efficient retrieval by an automated assistant during subsequent user interactions. In some implementations, low-quality transcripts are selectively filtered out based on various metadata. For instance, transcripts from interactions with less experienced agents or related to certain excluded subjects may be filtered to ensure the quality of the knowledge base. The (remaining) transcripts may be transformed into Q & A pairs using a language model (LM) that generates questions and answers based on the user and agent portions of the transcripts. System prompts may be provided to the LM that include instructions for generating questions and answers in specific formats or styles. A quality of each Q & A pair may be evaluated (e.g., based on a combination of accuracy, relevance, consistency, completeness, coherence, or generality) so that the Q & A pairs may be selectively included in the knowledge base based on their suitability for retrieval by the automated assistants. For instance, an LM may be prompted to generate subscores indicating an extent to which an answer correctly addresses a question, is relevant to the context, or can be generally applied. In some implementations, sensitive information (e.g., personally identifiable information (PII)) may be removed from transcripts to maintain privacy and ensure the accuracy of the knowledge base. The Q & A pairs may be vectorized into corresponding vector embeddings and stored in a vector database. By identifying points in the vector space corresponding to new user queries, determining similarities between the identified points and the stored Q & A pair vectors, reconstructing relevant Q & A pairs retrieved from the similar vector embeddings, and providing the reconstructed pairs as context for generating answers to the users' queries, an automated assistant can efficiently retrieve relevant information during subsequent user interactions and thus provide more accurate and comprehensive support to users.

The systems and methods described herein provide several technical benefits over conventional solutions for generating knowledge bases for automated assistants. By leveraging transcript data from user interactions to selectively transform transcripts into Q & A pairs and embed them as vectors in a vector space, the system enables efficient retrieval of relevant information during subsequent user interactions, even when topics are new or unseen. By filtering out low-quality transcripts based on metadata, the system ensures the quality and accuracy of the knowledge base. By utilizing LMs to generate questions and answers from transcripts, and evaluating Q & A pair quality based on factors like accuracy, relevance, consistency, completeness, coherence, and generality, the system provides a comprehensive and accurate knowledge base that can accommodate various formats, such as FAQs, step-by-step guidance, guided workflows, content creation, assistance bots, instructionals, or troubleshooting guides. By vectorizing Q & A pairs into corresponding vector embeddings and storing them in a vector database, the system facilitates precise semantic search and retrieval of relevant information. By identifying points in the vector space corresponding to new user queries, determining similarities between identified points and stored Q & A pair vectors, reconstructing relevant Q & A pairs from similar vector embeddings, and providing reconstructed pairs as context for generating answers, the system enables automated assistants to provide more accurate and comprehensive support to users. By automating the process of knowledge base generation and maintenance, the system reduces manual effort, accelerates model development, and improves overall performance of automated assistants in a wide range of applications.

Aspects of the present disclosure address the technical problem of generating comprehensive and accurate knowledge bases for automated assistants, which can be limited by manually created resources that are often out-of-date and lacking in volume and variety. This problem arises from the limitations of conventional approaches that rely on manual creation of articles or databases, leading to gaps in knowledge that result in inadequate responses or complete failure in addressing user inquiries. Aspects of the subject matter disclosed herein are not an abstract idea, such as a mere mental process that can be performed solely by the human mind. For example, while a human may attempt to manually create and update knowledge bases or estimate relevance based on limited information, they cannot feasibly analyze complex transcript data from user interactions, transform transcripts into Q & A pairs, evaluate Q & A pair quality, and vectorize Q & A pairs into corresponding vector embeddings in real-time, nor can they capture nuanced trends and patterns indicative of relevant information with high precision. The present disclosure leverages sophisticated computational techniques (e.g., training LMs to generate questions and answers from transcripts, computing quality scores based on accuracy, relevance, consistency, completeness, coherence, or generality, and continuously updating predictions using advanced statistical models) that achieve results far beyond human capability, thereby providing a technical solution to the problem of generating comprehensive and accurate knowledge bases for automated assistants. Moreover, the subject matter disclosed herein is not directed to organizing human activity or any conventional economic practice, but rather provides a technical solution to a problem that requires sophisticated computer technology. Specifically, various implementations of the present disclosure provide specific inventive steps to automate the generation and maintenance of knowledge bases using transcript data from user interactions, thereby improving the accuracy, efficiency, and scalability of automated assistants in modern computer-based systems.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

FIG. 1 shows an example computing system 100, according to some implementations. Various aspects of the computing system 100 disclosed herein are generally applicable for generating a knowledge base for facilitating interactions between users and an automated assistant and/or using a knowledge base to generate an answer to a user's query. The computing system 100 includes a combination of one or more processors 110, a memory 114 coupled to the one or more processors 110, one or more interfaces 120, one or more applications 130, one or more language models (LMs) 134, one or more databases 140, an online resource 150, an automated assistant 154, a transformation engine 160, an embedding engine 170, a personally identifiable information (PII) detection module 174, a redaction module 178, and/or a knowledge base 180. In some implementations, the various components of the computing system 100 are interconnected by at least a data bus 198. In some other implementations, the various components of the computing system 100 are interconnected using other suitable signal routing resources. In some implementations, the computing system 100 does not include one or more components illustrated in FIG. 1. For example, in various implementations, the computing system 100 may not include one or more of the interface 120, the application 130, the online resource 150, the automated assistant 154, the PII detection module 174, and/or the redaction module 178. In some of such implementations, the computing system 100 also may not include the transformation engine 160, such as in a real-time implementation.

The processor 110 includes one or more suitable processors capable of executing scripts or instructions of one or more software programs stored in the computing system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more hardware accelerators for processing a large amount of data and/or one or more artificial intelligence (AI) accelerators for accelerating AI and machine learning (ML)-based operations, such as one or more graphics processing units (GPUs), one or more tensor processing units (TPUs), one or more neural processing units (NPUs), a wafer-scale integration (WSI) architecture, or the like. For example, the processor 110 may use hardware-based TPUs to process and/or adjust millions, billions, or trillions of artificial neural network (ANN) parameters within seconds, milliseconds, or microseconds. As another example, one or more hardware-based NPUs may be used to accelerate ANN computations based on being optimized for efficiently executing deep learning (DL) techniques and performing AI and/or ML tasks (e.g., image recognition, natural language processing (NLP), executing trained AI models and/or automated assistants for inference, and the like).

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. Some implementations may incorporate specialized memory to support high-performance algorithm execution, particularly to address data transfer bottlenecks during AI and/or ML tasks, such as DL training and inference. For example, High Bandwidth Memory (HBM) may be used due to incorporating 3D-stacked dynamic random-access memory (DRAM) dies connected by through-silicon vias (TSVs), thereby enabling significantly faster data transfer rates between memory and processing units compared to conventional memory architectures. Implementations of the subject matter disclosed herein are not limited to any specific combination of hardware circuitry and/or software.

The interface 120 may include one or more input/output (I/O) interfaces used for transmitting or receiving (e.g., over a communications network, such as the Internet or an intranet) transmissions, metadata, identifiers, tags, flags, scores, prompts, vectors, assessments, queries, answers, or the like. The interface 120 may also be used to provide or receive other suitable information, such as computer code for updating one or more programs stored on the computing system 100, internet protocol requests and results, or the like. In various implementations, the interface 120 includes an interface with an ethernet cable to a modem, which may be used to communicate with an internet service provider (ISP) directing traffic to and from user devices and/or other parties. In various implementations, the interface 120 includes a display, a speaker, a mouse, a keyboard, an audio interface (e.g., microphone and speakers), a headset (e.g., a virtual reality headset or augmented reality headset), a haptic interface (among other examples), or other suitable input or output elements that allow interfacing with the computing system 100 by a user or moderator. The interface 120 may include a wired interface or wireless interface to the Internet or other means to communicably couple with another device.

The interface 120 may be used in conjunction with a communications network (not shown for simplicity) to access, communicate, and/or interact with a computing device, such as a computing device associated with a user of the system 100. The computing device may be any suitable wired or wireless computing device that can access, communicate, and/or interact with the system 100 via the communications network. For example, the communications network may provide communication links between the computing device and one or more of the applications 130, the LMs 134, the online resource 150, the automated assistant 154, and/or the knowledge base 180. The communications network may be any suitable one or more communication networks including, for example, the Internet, a wide area network (WAN), a metropolitan area network (MAN), a wireless local area network (WLAN), a personal area network (PAN) such as Bluetooth®, a portion of the Public Switched Telephone Network (PSTN), a cellular telephone network, a radio access network (RAN) such as a Fifth Generation (5G) New Radio (NR) system, an Ethernet network, a cable network, a satellite network, or any combination thereof. In other implementations, the communications network may provide communication links between the system 100 and each of a number of (e.g., technical support) agents (e.g., associated with the online resource 150). In various implementations, an agent may be a human agent or an AI agent. The communications network may include other computing devices, servers, interfaces, online resources, applications, or third-party systems in various implementations. The computing device may be a desktop computer, laptop computer, tablet computer, personal digital assistant (PDA), cellular telephone, smartphone, electronic book reader, or other suitable device. Any number of computing devices may be used to access, communicate, and/or interact with the system 100 via the interface 120 in conjunction with the communications network.

The one or more applications 130 may each include one or more interconnected modules or components that interact with each other to perform one or more functions or tasks, such as providing a desired functionality to a user that interacts with the application 130 and/or the online resource 150 via the interface 120. Example desired functionalities may include generating a knowledge base (e.g., which may include transforming transcripts into question-and-answer (Q & A) pairs and/or embedding Q & A pairs in a vector space) and/or utilizing an automated assistant that leverages the knowledge base to generate an answer in at least near real-time with receiving a query. In various implementations, the one or more applications 130 allow a user to access, communicate, and/or exchange information with the system 100, such as the online resource 150 and/or the automated assistant 154. In some instances, the application 130 may be a locally executed software product or service provided by the online resource 150. For example, the application 130 may be an accounting program such as QuickBooks® from Intuit, Inc. In other instances, the application 130 may be a generic browser through which the user can access and interact with the online resource 150. For example, the user can employ the browser to access and interact with QuickBooks Online® from Intuit, Inc. In some aspects, the application 130 may be an "App" suitable for mobile devices. In various implementations, the one or more applications 130 integrate aspects of ML, deep learning (DL), or AI to provide predictive capabilities, personalized recommendations, decision-making automation, or the like.

The one or more applications 130 may have a monolithic architecture, a microservices architecture including a plurality of services coupled via one or more application programming interfaces (APIs), and/or a distributed architecture across a plurality of processes and/or machines and network protocols. In various implementations, the one or more applications 130 may integrate with one or more external systems or services (e.g., via APIs) to enable the one or more applications 130 to interact with one or more third-party gateways, services, or platforms. In various implementations, the one or more applications 130 may be deployed on a variety of hardware platforms, mobile devices, embedded systems, or cloud servers, and may incorporate one or more CPUs, GPUs, TPUs, FPGAs, sensors, or other specialized hardware and/or AI-based accelerators designed to optimize performance for deep learning (DL) tasks. Some non-limiting example application tasks may include data processing, data analytics, fraud detection, transaction analysis, model simulation, static communication, real-time communication, collaboration, project management, entertainment, streaming, gaming, or any other suitable application task. In various implementations, the application may be developed based on a variety of programming languages and frameworks, such as Python, Node.js, Java, React.js, Angular, Flutter, or another suitable language or framework. In various implementations, the one or more applications 130 are hosted on a cloud platform (e.g., Amazon Web Services (AWS) or Azure) and/or an on-premise infrastructure (e.g., the database 140). In various implementations, the one or more applications 130 incorporate one or more security mechanisms, such as an authentication mechanism (e.g., multi-factor authentication (MFA)), data encryption (e.g., in transit and at rest), audit logging, an AI firewall, or the like.

The one or more LMs 134 may be any suitable generative AI model trained on a large corpus of text to generate written responses, answer questions, translate language, and/or assist with various NLP-related tasks. In various implementations, one or more of the LMs may be used to generate questions based on user portions of transcripts, generate answers based on agent portions of transcripts, generate assessments of and/or scores for Q & A pairs, determine a subject of a query, generate an answer to a query based on relevant Q & A pairs, or the like. The generations may be output by the LM 134 as a sequence of concatenated output tokens in the form of strings of text. Each of the LMs 134 may be associated with a model vocabulary comprising tens of thousands to hundreds of thousands of unique tokens (e.g., characters or combinations of characters). In various implementations, the LM 134 may be a large language model (LLM), a multimodal large language model (MLLM), or a small language model (SLM). In various implementations, one or more of the LMs 134 are integrated directly or embedded into one or more of the applications 130, the online resource 150, the automated assistant 154, the transformation engine 160, the embedding engine 170, or a separate component or service. In various implementations, the LM 134 may be hosted in conjunction with the computing system 100 (e.g., as a containerized microservice), the LM 134 may be hosted externally (e.g., accessed via one or more application programming interfaces (APIs) or cloud-based services) and in direct communication with one or more of the applications, or the LM 134 may be hosted externally and in indirect communication with the at least one application 130 or the online resource 150, for example (e.g., via an intermediate service, application, or system, such as an AI firewall). In various implementations, the LM 134 may use various AI accelerators to process vast amounts of textual data (e.g., from the Internet), integrate with one or more ANNs with millions, billions, trillions, or more weights or parameters, use self-supervised and/or semisupervised training methods, and/or incorporate aspects of the transformer architecture and/or mixture of experts (MoE). Example LMs may include OpenAI's ChatGPT, Google's Gemini, Meta's LLaMa, BigScience's BLOOM, Baidu's Ernie, Anthropic's Claude, Mistral AI's Mistral, independently developed models, or any another suitable type of generative AI model that outputs strings of text formed by a concatenation of tokens.

The database 140 may store data associated with the computing system 100, such as transcripts, models, data associated with the knowledge base 180, subjects, Q & A pairs, vectors, metadata, identifiers, tags, flags, scores, user portions, agent portions, prompts, instructions, assessments, queries, requests, and articles, among other suitable information. In various implementations, the database 140 may also store text input history, prompt history, reasoning, documents, categories, embeddings, lists, entities, arrays, logits, strings, events, datasets, instances, attributes, values, variables, degrees or measures (or other suitable quantities), decision trees, engines, classifiers, formulas, metrics, input, output, responses, application information, configurations, data associated with attacks and mitigation techniques, data associated with changes, events, change data capture (CDC) information, event bus (EB) information, filters, data assets, preferences, priorities, timestamps, models, algorithms, modules, engines, user information, historical data, recent data, current or real-time data, files, plugins, arrays, feedback, formats, features, among other suitable information.

The database 140 may store data related to artificial neural network (ANN) models, such as the models themselves, untrained models, pretrained models, tuned models, aligned models, reward models, neural network (NN) parameters (e.g., weights, biases, tensors, parameters), architectures (e.g., layer descriptions, neurons, activation functions, overall structures), training data and related information (e.g., statistics, distribution, size, preprocessing steps, training data, text corpora, tuning data, alignment data, alignment data snapshots, alignment preferences, metric logs, accuracies, loss functions and values), hyperparameters (e.g., learning rates, batch sizes, numbers of epochs), evaluation results (e.g., performance metrics and models, validation data, test sets, benchmark scores, thresholds, receiver operating characteristic (ROC) curves, confusion matrices), versioning information (e.g., iterations, updates), metadata and documentation (e.g., usage instructions, authors), deployment configurations (e.g., settings for deploying models in different environments), monitoring data (e.g., real-time or periodic tracking performance in production), or any other suitable data related to ANN models.

The database 140 may store data in one or more cloud object storage services, such as one or more Amazon Web Services (AWS)-based Simple Storage Service (S3) buckets. In various implementations, the database 140 incorporates aspects of a database management system (DBMS) or a relational DBMS (RDBMS). The data may be stored in one or more JavaScript Object Notation (JSON) files, comma-separated values (CSV) files, or any other suitable data objects for processing by the computing system 100. In some implementations, the data may be stored in one or more Structured Query Language (SQL) compliant datasets for filtering, querying, and sorting, or any other suitable format for processing by the computing system 100. In various implementations, the database 140 includes a relational database capable of presenting information as datasets in tabular form and capable of manipulating the datasets using relational operators.

The online resource 150 may provide a broad range of products, services, subscriptions, and/or applications (among other examples) over the communications network (e.g., to a user) via an associated computing device, such as in the manners described above with respect to the interface 120. The online resource 150 may provide such products, services, subscriptions, and/or applications to any number of users associated with any number of computing devices. In some implementations, the online resource 150 includes one or more of the applications 130, any number of which may incorporate one or more automated assistants (such as the automated assistant 154). In various implementations, the online resource 150 may include an API, a processor, a memory, and/or a database. The API may provide a programmatic interface that allows a computing device to communicate with the online resource 150 over the communications network. In some instances, the programmatic interface of the API may allow one or more of the applications 130 of the online resource 150 (e.g., as accessed via the computing device) to request invocation of the automated assistant 154 (e.g., to receive requests, queries, input data, and other information from the computing device), transmit responses to the requests, transmit answers to the queries, output information, and/or transmit other information over the communications network to the computing device. In other instances, the API may implement a user portal through which a web browser associated with the computing device may be used to access and exchange information with the online resource 150 over the communications network.

The automated assistant 154 may be used to assist a user with obtaining an answer to one or more of the user's queries or requests. In various implementations, the automated assistant 154 may be used for navigating websites and pages provided by the online resource 150, assisting the user with obtaining answers to questions pertaining to the operations, functionalities, capabilities, and/or other aspects of one or more products or services associated with the online resource 150, assisting the user with obtaining answers to requests for data and other information associated with one or more user accounts provided by the online resource 150, among other examples. In some instances, the automated assistant 154 may be invoked by the user uttering a designated word or phrase (e.g., "open the automated assistant") into the computing device, by the user touching an icon displayed on a mobile device, or by the user clicking a button or link presented on a monitor, among other examples. When invoked by the user, the automated assistant 154 may initiate a conversation between the user and the automated assistant 154 over the communications network. In some instances, the conversation may be conducted over an online chat. In other instances, the conversation may be conducted over a messaging feature accessible to the user. In some other instances, the conversation may be conducted over a voice call with the user.

Figure 2:
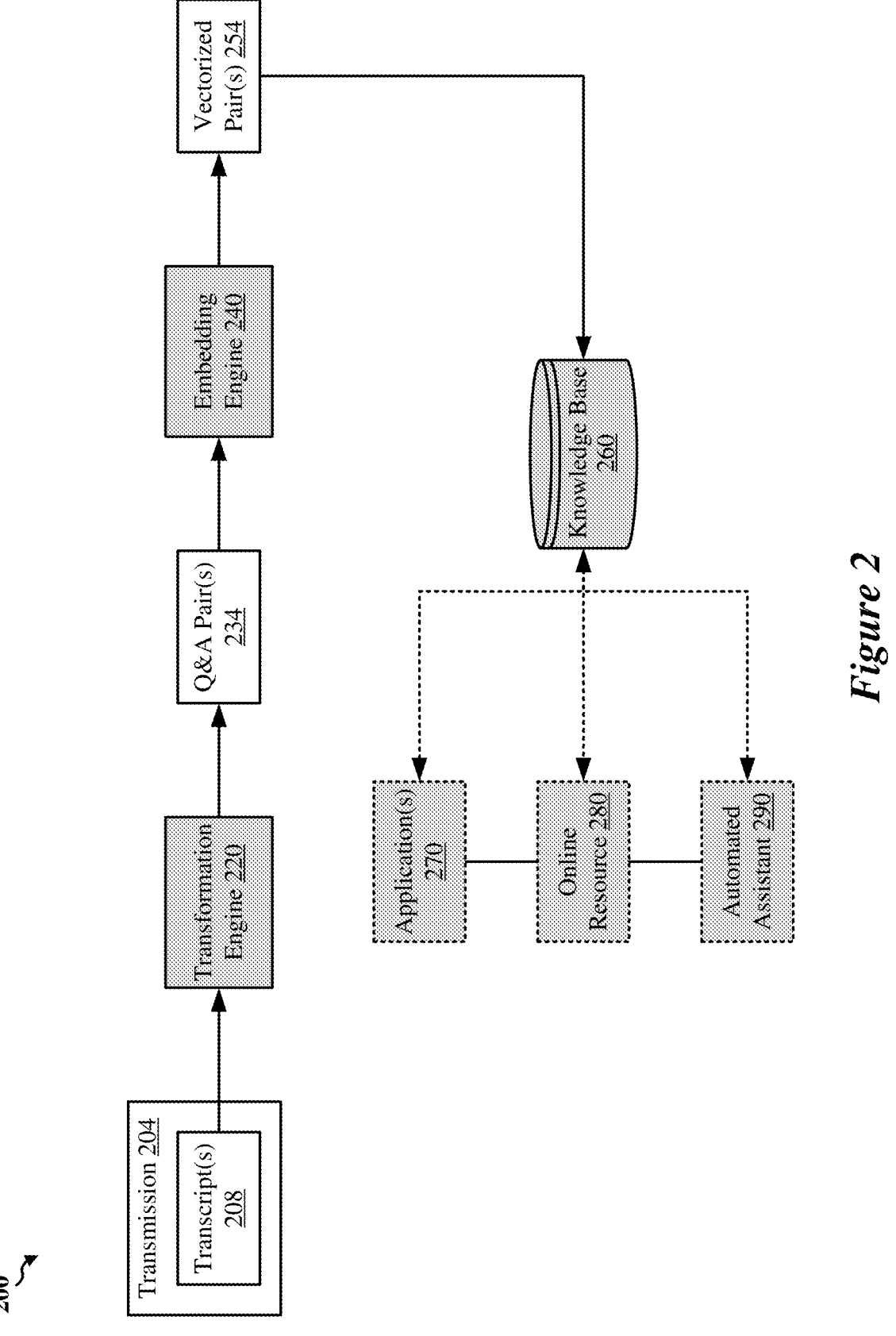
FIG. 2 shows an example process flow for generating a knowledge base, according to some implementations.
Figure 3:
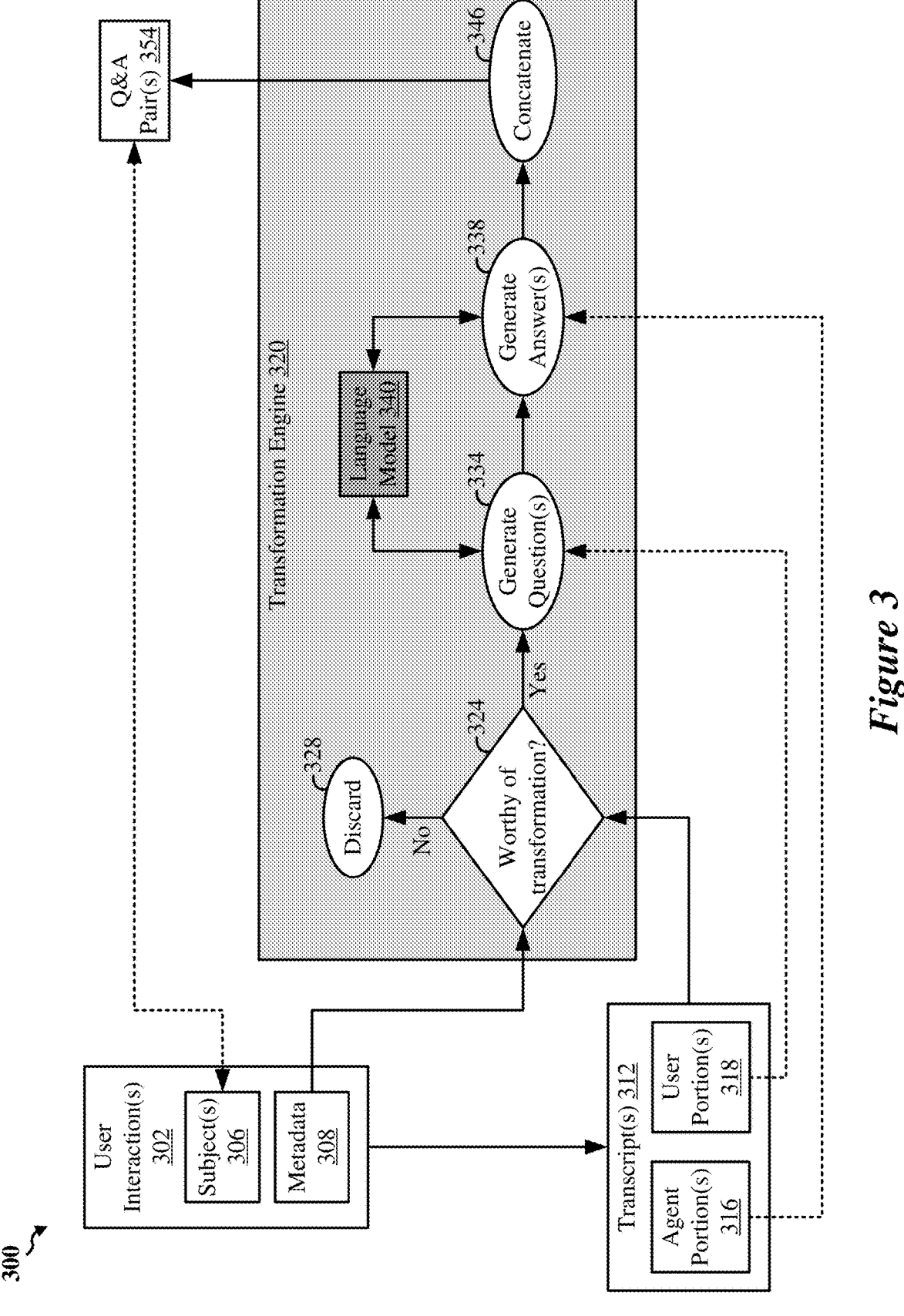
FIG. 3 shows an example process flow for transforming transcripts into question-and-answer (Q & A) pairs, according to some implementations.

The transformation engine 160 may be used to transform transcripts into Q & A pairs, as described at least with respect to FIGS. 2-3.

Figure 4:
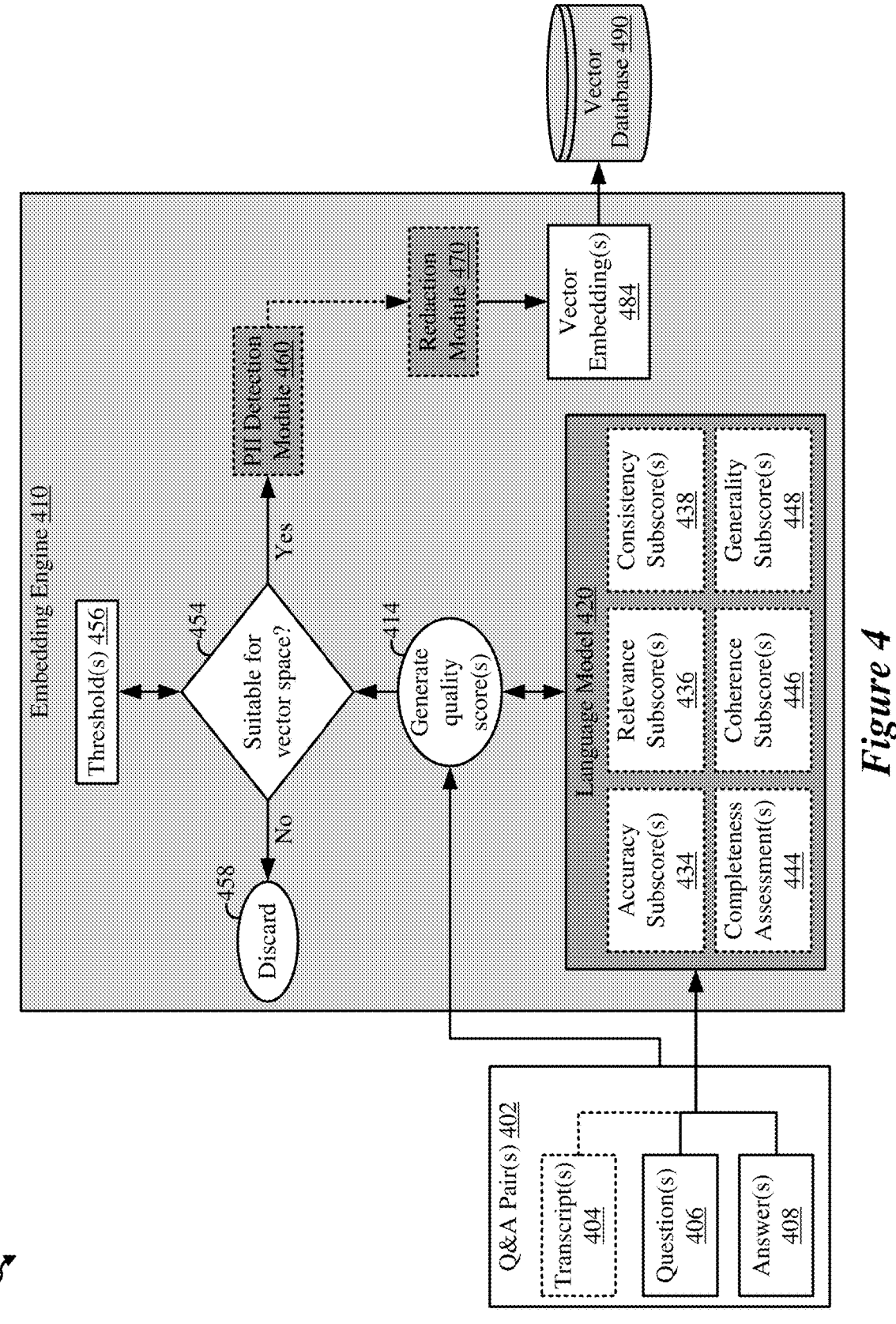
FIG. 4 shows an example process flow for embedding Q & A pairs in a vector space, according to some implementations.

The embedding engine 170 may be used to embed Q & A pairs in a vector space, as described at least with respect to FIGS. 2 and 4. In various implementations, the embedding engine may use the PII detection module 174 to identify PII in Q & A pairs and/or the redaction module 178 to remove PII from Q & A pairs, as described at least with respect to FIG. 4.

Figure 5:
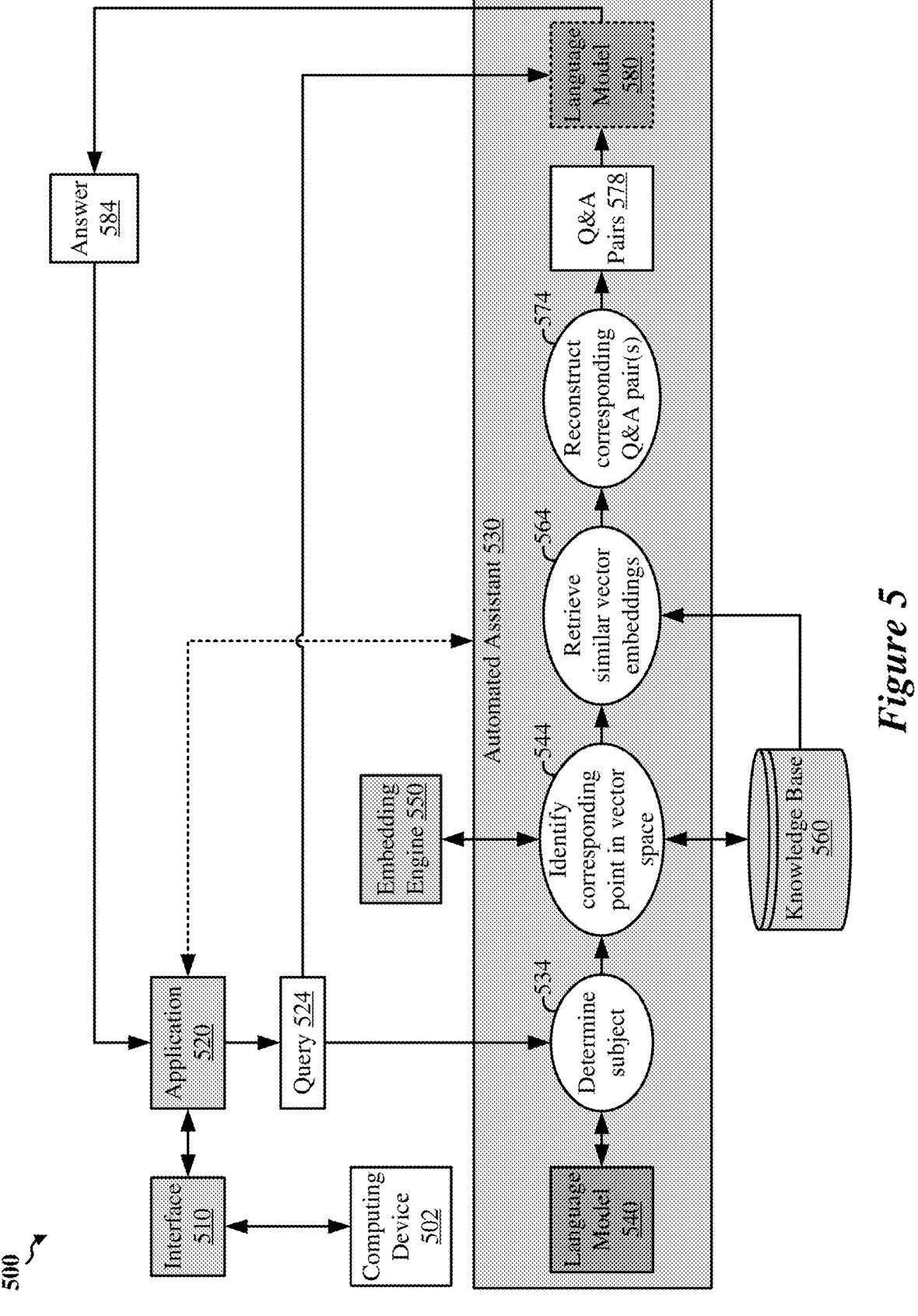
FIG. 5 shows an example process flow for using a knowledge base to generate an answer to a user's query, according to some implementations.

The knowledge base 180 may be generated for use by an automated assistant and/or used by an automated assistant to facilitate a user interaction, as described at least with respect to FIGS. 2 and 5. The generation of the knowledge base 180 may occur in an offline environment, and the use of the knowledge base 180 may occur in a real-time scenario. The user interaction may involve a user (and associated computing device) communicating (using the interface 120) with the automated assistant 154 over a communications network, such as through the online resource 150. The user interactions may be with the automated assistant 154 or with one or more agents associated with the computing system 100. The knowledge base 180 may be a vector database that stores and indexes vectors so that proximity metrics and vector space computations may be used to efficiently query, search, retrieve, and/or manipulate the stored vectors (e.g., using similarity search, such as cosine similarity, Euclidean distance, dot product, or Mahalanobis distance). In various implementations, the knowledge base 180 may store information such as tokenization metadata (e.g., token-level representations with token strings, positions, and/or byte-pair encoding (BPE) IDs or other tokenizer IDs), latent representations (i.e., hidden states or contextual embeddings extracted from one or more layers of the LM 134), generated output and ranking metadata (e.g., log-probabilities, beam scores, sampling temperatures, decoding parameters, or the like), task-specific annotations or features (e.g., target words, term or sentence context, syntactic roles, semantic roles, dependency tree information, or the like), or any other suitable information that enables the computing system 100 to reuse and trace context across multiple NLP-related tasks, such as storing vector embeddings, answering user queries, identifying relevant points in vector space, retrieving relevant vector embeddings, and the like. In various implementations, the knowledge base 180 may store dense vectors (e.g., capturing nuanced relationships between prompts and outputs), vectorized embeddings, or other high-dimensional representations and associated feature vectors in a vector space, such as to enable efficient similarity searches, clustering, and advanced AI analytics.

The application 130, the LM 134, the online resource 150, the automated assistant 154, the transformation engine 160, the embedding engine 170, the PII detection module 174, and the redaction module 178 are implemented in software, hardware, or a combination thereof. In some implementations, any one or more of application 130, the LM 134, the online resource 150, the automated assistant 154, the transformation engine 160, the embedding engine 170, the PII detection module 174, or the redaction module 178 is embodied in instructions that, when executed by the processor 110, cause the computing system 100 to perform operations. In various implementations, the instructions of one or more of said components and/or the interface 120 are stored in the memory 114, the database 140, the knowledge base 180, or a different suitable memory, and are in any suitable programming language format for execution by the computing system 100, such as by the processor 110. It is to be understood that the particular architecture of the computing system 100 shown in FIG. 1 is but one example of a variety of different architectures within which aspects of the present disclosure can be implemented. For example, in some implementations, components of the computing system 100 are distributed across multiple devices, included in fewer components, and so on. While the below examples related to generating a knowledge base for facilitating interactions between users and an automated assistant and/or using a knowledge base to generate an answer to a user's query are described with reference to the computing system 100, other suitable system configurations may be used.

FIG. 2 shows an example process flow 200 for generating a knowledge base, according to some implementations, and may be performed by one or more processors of a computing system, such as the computing system 100 described with respect to FIG. 1. The example process flow 200 shows a transformation engine 220, an embedding engine 240, a knowledge base 260, an application 270, an online resource 280, and an automated assistant 290, which may be examples of the transformation engine 160, the embedding engine 170, the knowledge base 180, the application 130, the online resource 150, and the automated assistant 154 described with respect to FIG. 1, respectively.

The example process flow 200 starts with receiving a transmission 204. In some implementations, the transmission 204 may be received over a communications network from a computing device (not shown for simplicity). The transmission 204 includes one or more transcripts 208. Each of the transcripts 208 may be associated with a user interaction. The transcripts 208 are provided to the transformation engine 220.

The example process flow 200 continues with transforming, using the transformation engine 220, ones of the transcripts 208 into one or more question-and-answer (Q & A) pairs 234. Each of the Q & A pairs 234 may be associated with a subject of the corresponding user interaction. The Q & A pairs 234 are provided to the embedding engine 240.

The example process flow 200 continues with embedding, using the embedding engine 240, ones of the Q & A pairs in a vector space as vectorized pairs 254, which may be stored (or "embedded" or "indexed" or "onboarded") in the knowledge base 260. Ones of the vectorized pairs 254 embedded in the knowledge base 260 may be retrieved by any one or more of the application 270, the online resource 280, or the automated assistant 290. The retrieval of the vectorized pair(s) 254 may occur during a subsequent user interaction. The subsequent user interaction may be associated with a subject similar to the subject(s) of the user interaction(s) from which the retrieved vectorized pair(s) 254 were derived.

FIG. 3 shows an example process flow 300 for transforming transcripts into question-and-answer (Q & A) pairs, according to some implementations, and may be performed by one or more processors of a computing system, such as the computing system 100 described with respect to FIG. 1. The example process flow 300 shows a transformation engine 320 and a language model (LM) 340, which may be examples of the transformation engine 220 and the LM 134, respectively, described with respect to FIGS. 1-2.

The example process flow 300 starts with obtaining, at the transformation engine 320, one or more transcripts 312, which may be an example of the transcripts 208 of FIG. 2. Each of the transcripts 312 may be associated with a corresponding user interaction 302. For instance, ones of the transcripts may be generated based on at least one of chat interactions or voice interactions between users and (e.g., technical support) agents and/or an automated assistant (e.g., the automated assistant 290 of FIG. 2). Each of the transcripts 312 may include an agent portion 316 representing the output provided by (or "the input from") the agent during the corresponding user interaction, and a user portion 318 representing the output provided by (or "the input from") the user during the corresponding user interaction. For instances where a given transcript is generated based on a user interaction with the automated assistant, the portion generated by the automated assistant may be considered the "agent portion" of the given transcript. Each of the user interactions 302 may be associated with a corresponding subject 306. Some non-limiting example subjects may include technical issues, product information, billing inquiries, order tracking, user account management, or the like. The subjects can be related to any topic depending on the use case. In some implementations, the subjects 306 are determined based on feeding the transcripts 312 to an LM (e.g., one of the LMs 134 and/or the LM 340) and prompting the LM to output the subject for each transcript. In some instances, the LM may be prompted to select a most contextually relevant subject from a plurality of predefined subjects.

Each of the user interactions 302 may be mapped to an associated set of metadata 308. Some non-limiting example information about a given user interaction 302 stored in the metadata 308 may include an identifier for an agent (e.g., an agent ID, an agent name, or the like) associated with the given user interaction, an identifier for a platform (e.g., a web portal, a mobile app, or the like) on which the given user interaction occurred, one or more tags (e.g., a product category, an issue type, or the like) indicating a subject of the given user interaction, a transfer flag (e.g., a binary flag, an escalation status, a transfer reason, or the like) indicating whether the given user interaction was escalated, a score (e.g., a user satisfaction rating, an agent performance rating, or the like) provided by the user for the given user interaction, or a resolution flag (e.g., a binary flag, an issue resolved status, a follow-up required indication, or the like) indicating whether the given user interaction was successfully resolved.

The example process flow 300 continues at decision block 324 with determining, using the transformation engine 320, whether each respective transcript 312 is worthy of transformation (e.g., of high enough quality) based on its associated metadata 308. Ones of the transcripts 312 deemed not worthy of transformation may be discarded at action block 328. As some non-limiting examples, a transcript 312 corresponding to a given user interaction may be deemed not worthy of transformation if the metadata 308 associated with the given user interaction indicates any one or more of that the agent associated with the given user interaction has less than a threshold level (e.g., 6 months, 1 year, 3 years, or the like) of experience based on the agent's identifier (e.g., which may be mapped to a start date for the agent), determining that the platform on which the corresponding user interaction occurred is on an excluded list of platforms based on the platform's identifier, determining that the subject of the corresponding user interaction is on an excluded list of subjects based on the one or more tags, determining that the corresponding user interaction was escalated (e.g., to a human or supervisor) based on the transfer flag, determining that the score provided by the user is below a score threshold, or determining that the corresponding user interaction was not successfully resolved based on the resolution flag. Otherwise, the ones of the transcripts 312 deemed worthy of transformation may proceed to action block 334.

The example process flow 300 continues at action block 334 with generating, using the transformation engine 320, a question for each respective transcript of the transcripts 312 based on the user portion 318 associated with the respective transcript. Furthermore, at action block 338, an answer may be generated, using the transformation engine 320, for the respective transcript based on the agent portion 316 associated with the respective transcript. The questions and answers may be generated based on feeding the user portions and the agent portions to the LM 340, respectively, along with a prompt to generate the questions and answers based on the respective portions.

The LM 340 may be configured with a system prompt that guides the generation of the questions and answers. As some non-limiting examples, the system prompt may include a set of instructions instructing the LM 340 to at least one of refrain from generating questions and answers related to user verification (e.g., to avoid sensitive information exposure), an instruction to refrain from generating questions and answers related to screen sharing (e.g., as it may not be relevant to resolving user issues), an instruction to generate questions from a first person perspective of the user (e.g., to create more relatable and personalized queries), an instruction to refrain from generating compound questions (e.g., to ensure clear and concise inquiries), an instruction to generate answers from a second person perspective of the agent (e.g., to provide direct guidance to users), an instruction to generate answers using conditional language (e.g., to address various possible user scenarios), an instruction to refrain from including personally identifiable information (PII) in questions or answers (e.g., to protect user privacy and maintain confidentiality), an instruction to refrain from including numbers in questions or answers (e.g., unless necessary for context, to minimize potential inaccuracies), an instruction to refrain from including dates in questions or answers (e.g., as they may become outdated quickly), an instruction to refrain from including URLs in questions or answers (e.g., to prevent directing users to potentially insecure or irrelevant sources), an instruction to refrain from including acronyms in questions or answers (e.g., to ensure clarity and avoid confusion for users unfamiliar with them), an instruction to refrain from generating questions and answers based on user interactions where the user's issue was not successfully resolved (e.g., as they may provide ineffective solutions), an instruction to generate questions and answers that are self-contained (e.g., to enable users to understand them independently of previous context) or to refrain from generating questions and answers that rely on previous context (e.g., to facilitate standalone inquiries and minimize confusion), or a guideline that the generated questions and answers are to be used to assist users with similar issues (e.g., so that they can find relevant solutions efficiently).

The example process flow 300 continues at action block 346 with concatenating, using the transformation engine 320, each generated question with its associated generated answer into a corresponding one of the Q & A pairs 354. The Q & A pairs 354 may be an example of the Q & A pairs 234 of FIG. 2. In this manner, the transformation engine 320 transforms ones of the transcripts 312 into one or more Q & A pairs 354, where each respective Q & A pair is associated with a subject 306 of the user interaction 302 from which the questions and answers used to generate the respective Q & A pair were derived.

FIG. 4 shows an example process flow 400 for embedding question-and-answer (Q & A) pairs in a vector space, according to some implementations, and may be performed by one or more processors of a computing system, such as the computing system 100 described with respect to FIG. 1. The example process flow 400 shows an embedding engine 410, a language model (LM) 420, a personally identifiable information (PII) detection module 460, a redaction module 470, and a vector database 490, which may be examples of the embedding engine 240, one or more of the LMs described above (e.g., the LM 134), the PII detection module 174, the redaction module 178, and the knowledge base 260, respectively, described with respect to FIGS. 1-3.

The example process flow 400 starts with obtaining Q & A pairs 402 at the embedding engine 410. The Q & A pairs 402 may be an example of the Q & A pairs 354 of FIG. 3. In some implementations, each respective Q & A pair of the Q & A pairs 402 may be mapped to (or otherwise associated with) a corresponding transcript 404 used in generating the respective Q & A pair, which may be an example of the transcript 312 of FIG. 3. Each respective Q & A pair of the Q & A pairs 402 may be mapped to (or otherwise associated with) a corresponding question 406 used in generating the respective Q & A pair (which may be an example of the question generated at action block 334 of FIG. 3) and a corresponding answer 408 used in generating the respective Q & A pair (which may be an example of the answer generated at action block 338 of FIG. 3).

The example process flow 400 continues at action block 414 with generating, using the embedding engine 410, one or more quality scores for each respective Q & A pair of the Q & A pairs 402. Each of the quality scores may be representative of the suitability of the respective Q & A pair for the vector space associated with the vector database 490.

In some implementations, the one or more quality scores for each respective Q & A pair of the Q & A pairs 402 are generated based on feeding, to the LM 420, the transcript 404 from which the respective Q & A pair was transformed (or "derived"), the question 406 associated with the respective Q & A pair, and the answer 408 associated with the respective Q & A pair. Thereafter, the LM 420 may be prompted to generate, for each respective Q & A pair, one or more of an accuracy subscore 434, a relevance subscore 436, or a consistency subscore 438. In some implementations, the LM 420 is prompted to generate at least two of said subscores, and the quality score for the respective Q & A pair may be based on a combination (e.g., an average) of the at least two subscores. In some other implementations where one subscore is generated for each respective Q & A pair, the quality score for the respective Q & A pair may be the one subscore. A system prompt may be provided to the LM 420 providing instructions that guide the LM 420 in generating the subscores. As some non-limiting examples, the system prompt may include at least one of an instruction that accuracy subscores are to indicate an extent to which the answer correctly answers the question based on the transcript (e.g., the answer correctly addresses the question based on information present within the transcript), an instruction that relevance subscores are to indicate an extent to which the answer is relevant to the question based on the transcript (e.g., the answer provides contextually appropriate information that pertains directly to the question asked, considering details from the provided transcript), or an instruction that consistency subscores are to indicate an extent to which a content of the question and answer matches a content of the transcript (e.g., the content of both the question and the answer aligns logically and coherently with information presented within the transcript).

A non-limiting example system prompt related to the accuracy subscore may include the following: "Determine a score from 1-10 indicating the accuracy level of the answer to the question based on the given transcript. 10 is the highest accuracy." Another non-limiting example system prompt related to the accuracy subscore may include the following: "Determine whether the question-and-answer pair is accurate based on information from the transcript and ensure that it does not contain invented information not from the transcript. Your response must be a single word output, either 'accurate' or 'inaccurate'. 'accurate' means all information provided in the question-and-answer pair is from the transcript and does not contain any invented information. 'inaccurate' means the generated question and answer pair contains information not from the transcript." Another non-limiting example system prompt related to the accuracy subscore may include the following: "Determine whether the answer is accurate to the question based on the transcript. Your response must be a single word output, either 'accurate', 'partially_accurate' or 'inaccurate'. 'accurate' means all information provided in the answer is correct and does not have misleading information according to the transcript. 'partially_accurate' means the answer contains one or more inaccuracies or misleading information according to the transcript. 'inaccurate' means the answer contains most or all incorrect or misleading information according to the transcript." In some instances, such an example system prompt may include "Provide the inaccurate reason if you rate something as 'partially_accurate' or 'inaccurate' and explicitly add what is inaccurate." A non-limiting example system prompt related to the relevance subscore may include the following: "Determine a score from 1-10 indicating how well the answer provides contextually appropriate information that pertains directly to the question asked, considering details from the provided transcript. 10 is the highest relevance." A non-limiting example system prompt related to the consistency subscore may include the following: "Determine a score from 1-10 indicating how logically and coherently the content of both the question and the answer aligns with information presented within the transcript. 10 is the highest consistency."

In some other implementations, the one or more quality scores for each respective Q & A pair of the Q & A pairs 402 are generated based on feeding, to the LM 420, the question 406 associated with the respective Q & A pair and the answer 408 associated with the respective Q & A pair. Thereafter, the LM 420 may be prompted to generate, for each respective Q & A pair, one or more of a completeness assessment 444, a coherence subscore 446, or a generality subscore 448. In some implementations, the LM 420 is prompted to generate at least two of said subscores, and the quality score for the respective Q & A pair may be based on a combination (e.g., an average) of the at least two subscores. In some other implementations where one subscore is generated for each respective Q & A pair, the quality score for the respective Q & A pair may be the one subscore. A system prompt may be provided to the LM 420 providing instructions that guide the LM 420 in generating the subscores. As some non-limiting examples, the system prompt may include at least one of an instruction that completeness assessments are to include a one word output indicating whether the answer comprehensively responds to the question (e.g., the answer provides all necessary information to address the user's query, leaving no gaps or ambiguities), an instruction that coherence subscores are to indicate an extent to which the answer is coherent (e.g., the answer presents information in a logical and organized manner, using clear and concise language that flows smoothly and is easy to understand), or an instruction that generality subscores are to indicate an extent to which the answer can be generally applied for any user (e.g., the answer provides guidance or solutions that are widely applicable, regardless of specific circumstances or contexts, and do not rely on specialized knowledge or assumptions about the user's situation). In such implementations, the subscores may be determined independent of the transcripts 404.

A non-limiting example system prompt related to the completeness assessment may include the following: "Determine a score from 1-10 indicating whether the question-and-answer pair is complete based on your assessment of the information in the question and answer. 10 is the highest completeness." A non-limiting example system prompt related to the coherence subscore may include the following: "Determine whether the answer is readable, easy to understand, structured logically, does not contain complicated language and is grammatically correct. Your response must be a single word output, either 'coherent' or 'incoherent'. 'coherent' means the answer is easy to understand, structured logically, and does not contain complicated language or spelling errors. "incoherent" means the answer contains confusing information, is not logical, or contains grammatical, spelling, or punctuation errors." A non-limiting example system prompt related to the generality subscore may include the following: "You are a system which takes a question-and-answer pair. You need to determine if the question and answer can be generalized well to other users of this system with similar issues and not too specific to the given user."

In some other implementations, the one or more quality scores are generated based on a combination of any one or more of the subscores described above or any other subscores, and may be dependent on or independent from the transcripts 404, as is suitable for the use case. In yet other implementations, one or more of the quality scores may be generated based at least in part on human input.

The example process flow 400 continues at decision block 454 with selectively embedding, using the embedding engine 410, each respective Q & A pair based on whether the one or more quality scores associated with the respective Q & A pair are above a threshold 456. In other words, the embedding engine 410 determines whether each respective Q & A pair is suitable for the vector space. In some implementations, a combination (e.g., the average) of the subscores generated for the respective Q & A pair are compared with a single overall threshold 456. In some other implementations, each subscore (e.g., the accuracy subscore 434) generated for each Q & A pair is compared with a corresponding one of the thresholds 456 (e.g., an accuracy subscore threshold). In some implementations, if any of the subscores are below its threshold, the respective Q & A pair is discarded at action block 458. In some other implementations, if the aggregate quality score (e.g., based on the average of the subscores) is below the threshold 456, the respective Q & A pair is discarded at action block 458. Otherwise, each of the Q & A pairs associated with an aggregate quality score above the threshold 456 and/or individual subscores above the one or more thresholds 456 may be retained for further processing.

In some implementations, the example process flow 400 continues with scanning each remaining Q & A pair using the PII detection module 460. In such implementations, prior to embedding a respective remaining Q & A pair as a vector embedding 484, the PII detection module 460 may be used to identify one or more portions (if any) of the respective Q & A pair that contain PII. As a non-limiting example, if the question is "How do I check my account balance for account number 1234567890?", and the answer is "You can determine your balance by clicking on 'Balance' at the top of the screen or within the 'Balance' tab in the mobile app. Your current balance for account number 1234567890 is $100.", then the PII detection module 460 may identify the "for account number 1234567890" portion of the question as PII and identify the "Your current balance for account number 1234567890 is $100" portion of the answer as PII. In some instances, the PII detection module 460 is an LM, such as the LM 420 or another of the LMs 134. Thereafter, the redaction module 470 may be used to modify the Q & A pairs identified to include PII so that the PII is removed from the identified portions. For this non-limiting example, the modified question may be "How do I check my account balance?", and the modified answer may be "You can determine your balance by clicking on 'Balance' at the top of the screen or within the 'Balance' tab in the mobile app." In some instances, the redaction module 470 is an LM, such as the LM 420 or another of the LMs 134. In some implementations, once redacted, the LM 420 may be used to regenerate the quality score for a given Q & A pair to determine whether the Q & A pair is still suitable for the vector space. If the redaction causes the quality score to fall below the threshold, the given Q & A pair may be discarded.

The example process flow 400 continues with generating, using the embedding engine 410, a vector embedding 484 for each remaining Q & A pair. In other words, each remaining Q & A pair is embedded in the vector space. The vector embeddings 484 may be an example of the vectorized pairs 254 of FIG. 2.

The vector embeddings 484 may be stored in the vector database 490 for retrieval by a user interaction artificial intelligence (AI) model during subsequent user interactions.

FIG. 5 shows an example process flow 500 for using a knowledge base to generate an answer to a user's query, according to some implementations, and may be performed by one or more processors of a computing system, such as the computing system 100 in conjunction with the online resource 150 described with respect to FIG. 1. The example process flow 500 shows an interface 510, an application 520, an artificial intelligence (AI) model 530, a language model (LM) 540, a knowledge base 560, and an LM 580, which may be examples of the interface 120, the application 270, the automated assistant 290, one or more of the LMs described above (e.g., the LM 134), the vector database 490, and one or more of the LMs described above (e.g., the LM 134), respectively, described with respect to FIGS. 1-4.

The example process flow 500 starts with receiving a query 524 at the automated assistant 530 during a user interaction. The query 524 may be submitted (e.g., by a user associated with a computing device 502 coupled to the online resource 150) over a communications network (not shown for simplicity) to the automated assistant 530, such as via the interface 510. The interface 510 may be used in conjunction with the application 520 and/or the online resource 150 to allow the user to interact with the automated assistant 530. In some implementations, the automated assistant 530 is an AI model provided by the online resource 150 and/or incorporated into the application 520 and provides users with answers in response to the users' queries. In some instances, the queries are related to using the application 520 and/or the online resource 150 that provides the application 520 and/or access to the automated assistant 530 to the user. In some other instances, the queries may be related to any other topic depending on the use case.

The example process flow 500 continues at action block 534 with determining, using the automated assistant 530, a subject of the query 524. The subject may be a real-time example of the subject 306 of FIG. 3. Determining the subject may include providing the query 524 to the LM 540 and prompting the LM 540 to output a subject of the query 524. In some implementations, the LM 540 is prompted to classify the query 524 into one of a plurality of predefined subjects.

The example process flow 500 continues at action block 544 with identifying, using the automated assistant 530, a point in vector space corresponding to the determined subject. It will be appreciated that each vector embedding in the vector space captures a semantic meaning of the original input, where relatively similar meanings are relatively closer together (and vice versa). Accordingly, the automated assistant 530 may use the embedding engine 550 to vectorize the determined subject into a subject vector embedding. In this manner, the automated assistant 530 may query the knowledge base 560 to identify the point corresponding to the subject vector embedding.

The example process flow 500 continues at action block 564 with retrieving, using the automated assistant 530, one or more vector embeddings from the knowledge base 560 based on the identified point. The vector embeddings may be an example of the vector embeddings 484 of FIG. 4. Specifically, the automated assistant 530 retrieves one or more vector embeddings that correspond to Q & A pairs that are most similar to the determined subject. Similarity in the vector space may be determined quantitatively based on at least one of a similarity measure or a vector-based distance between vector embeddings. For instance, retrieving the one or more vector embeddings may include identifying a top N vector embeddings nearest to the identified point.

The example process flow 500 continues at action block 574 with reconstructing, using the automated assistant 530, the corresponding Q & A pairs from the one or more vector embeddings retrieved from the knowledge base 560. The reconstructed Q & A pairs 578 may be an example of the Q & A pairs 402 of FIG. 4.

The example process flow 500 continues with providing the query 524 and the reconstructed Q & A pairs 578 to the LM 580. In some implementations, the query 524 and the reconstructed Q & A pairs 578 are instead provided to the LM 540. The LM may be configured to generate an answer 584 to the query 524 based on the reconstructed Q & A pairs 578. As a non-limiting example, the query 524 may be "I want to know how much I have in my account.", the identified subject may thus be "account balance," which may cause one of the reconstructed Q & A pairs to include a question of "How do I check my account balance?" and an answer of "You can determine your balance by clicking on 'Balance' at the top of the screen or within the 'Balance' tab in the mobile app.", and thus the generated answer 584 may be "You can check how much you have in your account by clicking on 'Balance' at the top of the screen or within the 'Balance' tab in the mobile app."

Upon obtaining the answer 584 from the LM, the answer 584 may be provided to the user using the automated assistant 530, such as via the interface 510.

In some implementations, the example process flow 500 may be implemented in real-time. In such implementations, the automated assistant 530 may provide the answer 584 in at least near real-time with receiving the query 524.

It will be appreciated that, in practical applications, the process flows 200, 300, 400, and 500 described above related to knowledge base generation and query answering may involve processing large volumes of transcripts, Q & A pairs, and user queries, and generating vast amounts of data within a very short timeframe (e.g., in at least near real-time). For instance, the system may process millions of transcripts, generate billions of Q & A pairs, and handle thousands of user queries per second. To efficiently handle such high-volume processing, various system components (e.g., the transformation engine, the embedding engine, the automated assistant, and/or the LMs) may be configured to utilize one or more specialized hardware accelerators, such as tensor processing units (TPUs) or graphics processing units (GPUs), that are optimized for machine learning (ML)

workloads. Additionally, the system may use optimized data structures (e.g., vector databases, sparse matrices, tensors, or the like) and various optimization techniques (e.g., parallel processing, distributed computing, model pruning, knowledge distillation, or the like) to efficiently manage and process the large amounts of data. The system may also utilize a cloud-based infrastructure (i.e., a suitable cloud computing platform that provides scalable and on-demand access to computing resources) and/or containerization (i.e., a suitable containerization technology that enables efficient deployment, management, and orchestration of containers in a distributed environment) to further improve scalability, reliability, and fault tolerance. In these manners, the system may be effectively scaled to handle real-world applications with high-throughput requirements, thereby enabling rapid processing of vast numbers of transcripts and user queries while maintaining accuracy and relevance in generating a knowledge base and/or answering queries.

FIG. 6 shows an illustrative flowchart 600 depicting an example operation for generating a knowledge base for facilitating interactions between users and an automated assistant, according to some implementations, and may be performed by one or more processors of a computing system, such as the computing system 100 described with respect to FIG. 1. For example, at block 610, the computing system 100 receives a transmission over a communications network from a computing device, the transmission including a plurality of transcripts of user interactions with the automated assistant or agents associated with the computing system. At block 620, the computing system 100 transforms ones of the transcripts into one or more question-and-answer (Q & A) pairs associated with a subject of the corresponding user interaction. At block 630, the computing system 100 embeds ones of the Q & A pairs as vectors in a vector space for retrieval by the automated assistant during subsequent user interactions associated with similar subjects.

FIG. 7 shows an illustrative flowchart 700 depicting an example operation for using a knowledge base to generate an answer to a user's query, according to some implementations, and may be performed by one or more processors of an online resource, such as the online resource 150 described with respect to FIG. 1. For example, at block 710, the online resource 150 receives a user query from a user over a communications network coupled to the online resource. At block 720, the online resource 150 determines, using a first language model (LM), a subject of the user query. At block 730, the online resource 150 identifies a point in vector space corresponding to the determined subject. At block 740, the online resource 150 retrieves, from the knowledge base, one or more vector embeddings based on using the identified point in conjunction with a vector similarity technique, each of the retrieved vector embeddings corresponding to a question-and-answer (Q & A) pair used in generating the knowledge base. At block 750, the online resource 150 reconstructs the corresponding Q & A pairs from the one or more vector embeddings retrieved from the vector space. At block 760, the online resource 150 provides the user query and the reconstructed Q & A pairs to a second LM. At block 770, the online resource 150 obtains, from the second LM, an answer to the user query.

As used herein, a phrase referring to "at least one of" a list of items refers to any combination of those items, including single members. As an example, "at least one of: a, b, or c" is intended to cover: a, b, c, a-b, a-c, b-c, and a-b-c. Similarly, unless noted otherwise, "or" is used inclusively herein, such that "a, b, or c" refers to any combination of those items, including single members.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for generating a knowledge base for facilitating interactions between users and an automated assistant, the method performed by one or more processors of a computing system and comprising:

receiving a transmission over a communications network from a computing device, the transmission including a plurality of transcripts of user interactions with the automated assistant or agents associated with the computing system;

transforming ones of the transcripts into one or more question-and-answer (Q & A) pairs associated with a subject of the corresponding user interaction, wherein the transforming includes:

generating, using a language model (LM), a question based on a user portion of the respective transcript;

generating, using the LM, an answer based on an agent portion of the respective transcript; and determining, using the LM, a subject associated with the question and answer based on the respective transcript; and embedding ones of the Q & A pairs and their associated subjects as vectors in a vector space for retrieval by the automated assistant during subsequent user interactions associated with similar subjects, wherein the embedding includes:

vectorizing each of the ones of the Q & A pairs and their associated subject into a corresponding vector embedding in real-time.

2. The method of claim 1, wherein transforming the ones of the transcripts includes:

determining, for each respective transcript, whether the respective transcript is worthy of transformation based on metadata associated with the corresponding user interaction; and selectively transforming the respective transcript based on whether it is deemed worthy of transformation, wherein selectively transforming the respective transcript includes:

transforming the respective transcript into one or more Q & A pairs responsive to deeming it worthy of transformation; and refraining from transforming the respective transcript into one or more Q & A pairs responsive to deeming it not worthy of transformation.

3. The method of claim 2, wherein the metadata indicates at least one of an identifier for an agent associated with the corresponding user interaction, an identifier for a platform on which the corresponding user interaction occurred, one or more tags indicating a subject of the corresponding user interaction, or a transfer flag indicating whether the corresponding user interaction was escalated.

4. The method of claim 3, wherein deeming that a respective transcript is not worthy of transformation includes at least one of determining that the agent associated with the corresponding user interaction has less than a threshold level of experience based on the agent's identifier, determining that the platform on which the corresponding user interaction occurred is on an excluded list of platforms based on the platform's identifier, or determining that the corresponding user interaction was escalated based on the transfer flag.

5. The method of claim 1, wherein the user portion of each respective transcript corresponds to input from the user during the corresponding user interaction and the agent portion of each respective transcript corresponds to input from an agent or the automated assistant during the corresponding user interaction, and wherein transforming a respective transcript into one or more Q & A pairs includes:

concatenating the generated question and generated answer.

6. The method of claim 5, further comprising:

providing a system prompt to the LM, wherein the system prompt includes a set of instructions for the LM in generating the questions and answers, and wherein the set of instructions includes at least one of an instruction to refrain from generating questions and answers related to user verification, an instruction to refrain from generating questions and answers related to screen sharing, an instruction to generate questions from a first person perspective of the user, an instruction to refrain from generating compound questions, an instruction to generate answers from a second person perspective of the agent, an instruction to generate answers using conditional language, an instruction to refrain from including personally identifiable information (PII) in questions or answers, an instruction to refrain from including numbers in questions or answers, an instruction to refrain from including dates in questions or answers, an instruction to refrain from including URLs in questions or answers, or an instruction to refrain from including acronyms in questions or answers.

7. The method of claim 1, further comprising:

generating, for each respective Q & A pair, one or more quality scores representative of a suitability of the respective Q & A pair for the vector space, wherein embedding the ones of the Q & A pairs and their associated subjects as vectors in the vector space includes:

embedding the respective Q & A pair as a vector in the vector space responsive to determining that the one or more quality scores are above a threshold; and refraining from embedding the respective Q & A pair as a vector in the vector space responsive to determining that the one or more quality scores are not above the threshold.

8. The method of claim 7, wherein generating the one or more quality scores for each respective Q & A pair includes:

feeding, to a language model (LM), the transcript from which the respective Q & A pair was transformed, the question for the respective Q & A pair, and the answer for the respective Q & A pair;

prompting the LM to generate, for the respective Q & A pair, at least two of an accuracy subscore, a relevance subscore, or a consistency subscore; and generating the one or more quality scores for the respective Q & A pair based on a combination of the at least accuracy subscore, relevance subscore, or consistency subscore.

9. The method of claim 8, further comprising:

providing a system prompt to the LM, wherein the system prompt includes a set of instructions for the LM in generating subscores, and wherein the set of instructions includes an instruction that accuracy subscores are to indicate an extent to which the answer correctly answers the question based on the transcript, an instruction that relevance subscores are to indicate an extent to which the answer is relevant to the question based on the transcript, and an instruction that consistency subscores are to indicate an extent to which a content of the question and answer matches a content of the transcript.

10. The method of claim 7, wherein generating the one or more quality scores for each respective Q & A pair includes:

feeding, to a language model (LM), the question for the respective Q & A pair and the answer for the respective Q & A pair;

prompting the LM to generate, for the respective Q & A pair, at least two of a completeness assessment, a coherence subscore, or a generality subscore; and generating the one or more quality scores for the respective Q & A pair based on a combination of the at least completeness assessment, coherence subscore, or generality subscore.

11. The method of claim 10, further comprising:

providing a system prompt to the LM, wherein the system prompt includes a set of instructions for the LM in generating subscores, and wherein the set of instructions includes an instruction that completeness assessments are to include a one word output indicating whether the answer comprehensively responds to the question, an instruction that coherence subscores are to indicate an extent to which the answer is coherent, and an instruction that generality subscores are to indicate an extent to which the answer can be generally applied for any user.

12. The method of claim 7, further comprising:

prior to embedding a respective Q & A pair as a vector in the vector space, identifying, using a personally identifiable information (PII) detection module, one or more portions of the respective Q & A pair containing PII;

modifying, using a redaction module, the one or more identified portions in the respective Q & A pair to remove the PII; and embedding the modified Q & A pair as a vector in the vector space.

13. The method of claim 1, wherein the embedding further includes:

storing the vector embeddings in a vector database.

14. The method of claim 13, wherein the automated assistant is configured to, during a subsequent user interaction:

receive a user query;

determine, using a language model (LM), a subject of the user query;

identify a point in the vector space corresponding to the determined subject; and retrieve one or more vector embeddings based on the identified point, wherein the retrieved vector embeddings correspond to the ones of the Q & A pairs that are most similar to the determined subject.

15. The method of claim 14, wherein retrieving the one or more vector embeddings includes identifying a top N vector embeddings nearest to the identified point.

16. The method of claim 14, wherein similarity in the vector space is determined quantitatively based on at least one of a similarity measure or a vector-based distance between vector embeddings.

17. The method of claim 14, wherein the automated assistant is further configured to:

reconstruct the corresponding Q & A pairs from the one or more vector embeddings retrieved from the vector space;

provide the user query and the reconstructed Q & A pairs to a language model (LM); and obtain, from the LM, an answer to the user query.

18. A computing system for generating a knowledge base for facilitating interactions between users and an automated assistant associated with the computing system, the computing system comprising:

one or more processors; and at least one memory coupled to the one or more processors and storing instructions that, when executed by the one or more processors, cause the computing system to perform operations including:

receiving a transmission over a communications network from a computing device, the transmission including a plurality of transcripts of user interactions with the automated assistant or agents associated with the computing system;

transforming ones of the transcripts into one or more question-and-answer (Q & A) pairs associated with a subject of the corresponding user interaction, wherein the transforming includes:

generating, using a language model (LM), a question based on a user portion of the respective transcript;

generating, using the LM, an answer based on an agent portion of the respective transcript; and determining, using the LM, a subject associated with the question and answer based on the respective transcript; and embedding ones of the Q & A pairs and their associated subjects as vectors in a vector space for retrieval by the automated assistant during subsequent user interactions associated with similar subjects, wherein the embedding includes:

vectorizing each of the ones of the Q & A pairs and their associated subject into a corresponding vector embedding in real-time.

19. A method for using a knowledge base to generate an answer to a user's query, the method performed by one or more processors of an online resource and comprising:

receiving a query from a user over a communications network coupled to the online resource;

determining, using a first language model (LM), a subject of the user query;

vectorizing the determined subject into a subject vector embedding;

identifying a point in vector space corresponding to the subject vector embedding;

retrieving, from the knowledge base, one or more vector embeddings based on a similarity between the subject vector embedding and the vector embeddings stored in the knowledge base, the similarity determined based in part on the identified point, and each of the retrieved vector embeddings corresponding to a question-and-answer (Q & A) pair used in generating the knowledge base;

reconstructing the corresponding Q & A pairs from the one or more vector embeddings retrieved from the vector space;

providing the user query and the reconstructed Q & A pairs to a second LM; and obtaining, from the second LM, an answer to the user query in real-time with receiving the query.

20. The method of claim 19, further comprising:

sending, over the communications network, the answer to the user via an interface using an automated assistant provided by the online resource.

\* \* \* \* \*